United States Patent
Yu

(10) Patent No.: US 7,924,941 B2
(45) Date of Patent: Apr. 12, 2011

(54) DIGITAL PRE-DISTORTION FOR ORTHOGONAL FREQUENCY DIVISION MULTIPLEXING (OFDM) SIGNALS

(75) Inventor: Xiaoyong Yu, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 734 days.

(21) Appl. No.: 11/945,415

(22) Filed: Nov. 27, 2007

(65) Prior Publication Data

US 2009/0135949 A1   May 28, 2009

(51) Int. Cl.
  *H04K 1/02*   (2006.01)
(52) U.S. Cl. ........................................ 375/296
(58) Field of Classification Search .................. 375/296
  See application file for complete search history.

(56) References Cited

U.S. PATENT DOCUMENTS

| 6,130,918 | A | 10/2000 | Humphrey et al. | |
|---|---|---|---|---|
| 7,013,161 | B2 | 3/2006 | Morris | |
| 2004/0218689 | A1* | 11/2004 | Akhtman | 375/296 |
| 2006/0078066 | A1 | 4/2006 | Yun et al. | |
| 2006/0250936 | A1 | 11/2006 | Chen et al. | |
| 2007/0041459 | A1 | 2/2007 | Yeon et al. | |
| 2010/0151803 | A1* | 6/2010 | Seki et al. | 455/127.1 |

OTHER PUBLICATIONS

May, Thomas et al.: Reducing the Peak-to-Average Power Ratio in OFDM Radio Transmission Systems, Proceedings of IEEE VTC'98, Ottawa, Canada, pp. 2474-2478.
Li, Xiaodong et al.: Effects of Clipping and Filtering on the Performance of OFDM, Proceedings of IEEE VTC'97, 1997, pp. 1634-1638.
van Nee, Richard D. J.: OFDM Codes for Peak-To-Average Power Reduction and Error Correction, IEEE Global Telecom. Conference, London, Nov. 18-22, 1996, pp. 740-744.
3GPP TR 25.814 v1.5.0 (May 2006), 3rd Generation Partnership Project; Technical Specification Group Radio Access Network; Physical Layer Aspects for Evolved UTRA (Release 7), May 2006.
Proakis, J.G.: "Digital Communications", McGraw-Hill, 1993, pp. 278-285.

* cited by examiner

*Primary Examiner* — Kevin Y Kim

(57) ABSTRACT

A method (300) and a system (100) for processing an orthogonal frequency division multiplexing (OFDM) signal. At least one portion of an OFDM symbol (125) that exceeds an amplitude limiting threshold can be identified. The identified portion of the OFDM symbol (125) can be filtered to generate a pre-distortion noise (145). The OFDM symbol (125) and the pre-distortion noise (145) can be combined to generate a pre-distorted OFDM symbol (165).

8 Claims, 4 Drawing Sheets

300

Process portions of the OFDM symbol that exceed an amplitude limiting threshold to generate limiting noise

305

Filter the limiting noise to generate a pre-distortion noise

310

Communicate the pre-distortion noise to an adder

DIGITAL PRE-DISTORTION FOR ORTHOGONAL FREQUENCY DIVISION MULTIPLEXING (OFDM) SIGNALS

FIELD OF THE INVENTION

The present invention generally relates to communications and, more particularly, to orthogonal frequency division multiplexing (OFDM) communications.

BACKGROUND OF THE INVENTION

Orthogonal frequency division multiplexing (OFDM) is a digital transmission technique in which a signal is split into a series of orthogonal narrowband subcarriers. Each subcarrier can be modulated using any of a variety of modulation techniques (e.g. quadrature amplitude modulation (QAM), binary phase shift keying (BPSK), quadrature phase shift keying (QPSK), etc.), and an inverse Fourier transform may be performed on the subcarriers. The subcarriers typically are uncorrelated to each other, and phase differences between the subcarriers may be random. In consequence, large variations in the instantaneous power level of the signal can occur. For example, when the phases of all the subcarriers combine constructively, the power level of the signal may peak well above the average power level. This large peak to average power ratio (PAPR) is characteristic of OFDM systems.

A disadvantage of a signal having a large PAPR is that complex analog-to-digital and digital-to-analog conversion may be required to process the signal due to a large number of bits that are required to represent the signal. Another disadvantage is that power amplifiers with large linear operating ranges may be required for signal processing. Power amplifiers having large linear operating ranges typically are not efficient because large bias currents are necessary to deliver the occasional power peak. This issue can lead to a requirement for power detection and power reduction schemes for the power amplifier, which consume valuable system resources. Accordingly, it is desirable to reduce OFDM signal PAPR.

There are three categories of techniques that are sometimes implemented to reduce PAPR. One category of techniques relies on signal distortion. Signal distortion can be implemented, for example, by nonlinearly manipulating the OFDM signal at or around the signal peaks, which results in reduced PAPR. The simplicity and efficiency of this technique contributes to its wide use, but leads to signal damage, and therefore produces a higher symbol error rate (SER). The second category uses encoding methods that exclude OFDM symbols with large PAPR, and the third category of techniques scramble each OFDM symbol with different sequences. The last two techniques require that both transmitter and receiver perform paired signal processing, a methodology not supported by some communication system standards.

SUMMARY OF THE INVENTION

The present invention relates to a method of processing an orthogonal frequency division multiplexing (OFDM) signal. The method can include identifying at least one portion of the OFDM symbol that exceeds an amplitude limiting threshold and filtering the identified portion of the OFDM symbol to generate a pre-distortion noise. The pre-distortion noise can be combined with the OFDM symbol to generate a pre-distorted OFDM symbol.

The present invention also relates to an OFDM signal pre-distortion processing system. The system can include a peak detector that identifies a portion of an OFDM symbol that exceeds an amplitude limiting threshold, a pre-distortion noise generator that filters the identified portion of the OFDM symbol and generates a pre-distortion noise, and an adder that combines the OFDM symbol and the pre-distortion noise to generate a pre-distorted OFDM symbol.

The present invention also relates to a computer program product including a computer-usable medium having computer-usable program code that, when executed, causes a machine to perform the various steps and/or functions described herein.

BRIEF DESCRIPTION OF THE DRAWINGS

Preferred embodiments of the present invention will be described below in more detail, with reference to the accompanying drawings, in which:

FIG. 3 depicts a flow chart that is useful for understanding the present invention.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a method and a system for digital pre-distortion of orthogonal frequency division multiplexing (OFDM) signals. More particularly, the arrangements disclosed herein provide an OFDM system which can monitor for peaks in an OFDM symbol, remove the peaks from the OFDM symbol, and filter the peaks that are removed to generate pre-distortion noise. The system also can combine the original OFDM symbol with the pre-distortion noise. Accordingly, when the amplitude of the OFDM symbol is limited by an output amplifier, a large portion of the information that otherwise would be lost due to limiting is now preserved.

Figure 1:
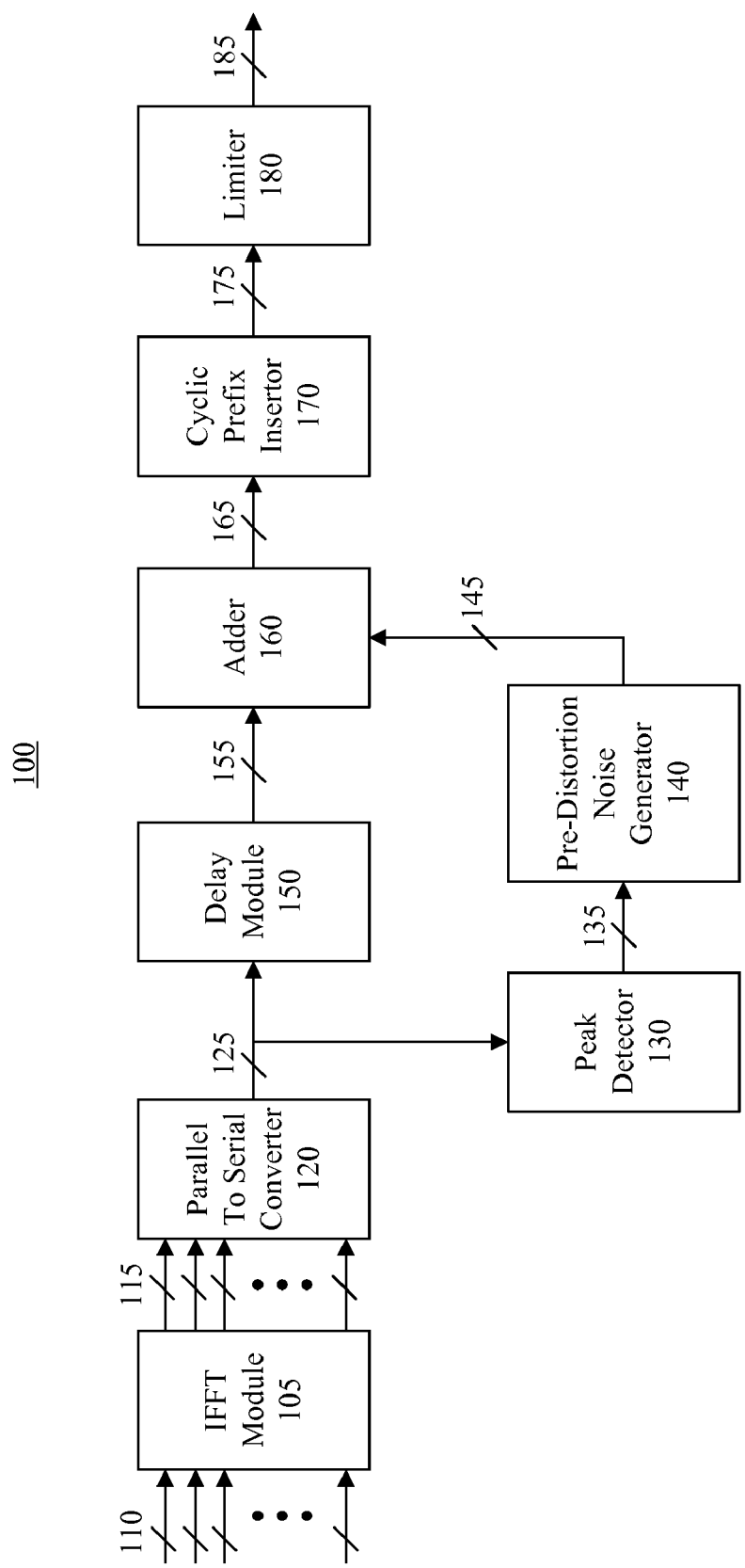
FIG. 1 depicts a block diagram that is useful for understanding the present invention.

FIG. 1 depicts a block diagram of an OFDM signal processing system 100 that is useful for understanding the present invention. The system 100 can include an inverse fast Fourier transform (IFFT) module 105. The IFFT module 105 can receive a plurality of subcarrier data streams 110 modulated in the frequency domain. The subcarrier data streams 110 may be modulated using a plurality of modulation schemes (e.g., quadrature amplitude modulation (QAM), binary phase shift keying (BPSK), quadrature phase shift keying (QPSK), etc.).

From the subcarrier data streams 110 the IFFT module 105 can generate multiple OFDM symbols, for instance an OFDM symbol 115, represented in the time domain. The OFDM symbol 115 can comprise a plurality of time domain digital samples. The time domain digital samples can correspond to digital samples represented in the frequency domain by the subcarrier data streams 110, though there need not be a one-to-one correspondence between the number of such samples and the number of data subcarriers in the frequency domain. To generate the time domain digital samples, the IFFT module 105 can perform an IFFT on the subcarrier data streams 110. A group of the generated time domain samples may collectively represent the OFDM symbol 115. As such, the OFDM symbol 115 can comprise a block of N samples in parallel, where N is the IFFT or FFT size of the OFDM system. The system 100 also may include a parallel-to-serial converter 120 that can receive the OFDM symbol 115 and serially output the block of N samples to generate a serialized OFDM symbol 125.

The system 100 further can include a peak detector 130, which can receive the OFDM symbol 125 and monitor when the OFDM symbol 125 exceeds an amplitude limiting threshold as set by the system 100. The term "amplitude limiting threshold," as used herein, refers to a peak amplitude output level of the system 100. The peak amplitude output level can be a desired output level or a maximum output level of a system component, such as an output amplifier. The peak detector 130 can identify one or more portions of the OFDM symbol 125 that exceed the amplitude limiting threshold and, from the identified portions, generate a limiting noise 135. In particular, the limiting noise can comprise the portion(s) of the OFDM symbol 125 that exceed the amplitude limiting threshold. Also, the peak detector 130 can generate a limiting indicator that indicates when the portion(s) of the OFDM symbol 125 exceeds the amplitude limiting threshold.

A pre-distortion noise generator 140 also can be provided. The pre-distortion noise generator 140 can receive the limiting noise 135 and process such noise, as will be discussed in greater detail in FIG. 3, to generate a pre-distortion noise 145.

The system 100 further can include a delay module 150 that receives the OFDM symbol 125 and delays the OFDM symbol 125 by an amount of time equal to the processing time required to generate the limiting noise 135 and the pre-distortion noise 145, thereby generating a delayed OFDM symbol 155. The delay module 150 thus can assure that the symbols 145 and 155 are phase aligned.

The system 100 also can include an adder 160 which combines the OFDM symbol 155 and the pre-distortion noise 145 to generate a pre-distorted OFDM symbol 165. The addition of the pre-distortion noise 145 to the OFDM symbol 155 can serve to reduce nonlinear effects (e.g., distortion) introduced by signal limiting that occurs prior to signal transmission, for example, by the limiter 180, which will be discussed later. In particular, the pre-distortion processing can increase the level of limiting noise in subcarriers using modulation schemes having a high level of noise immunity (e.g., BPSK, QPSK, etc.), and decrease the level of limiting noise in subcarriers with modulation schemes having a low level of noise immunity (e.g., 64 QAM). This redistribution of limiting noise contribution can improve overall symbol error rate (SER) and thus improve the overall performance of the OFDM system 100.

The adder 160 outputs the pre-distorted OFDM symbol 165. For example, the adder 160 can communicate the pre-distorted OFDM symbol 165 to a cyclic prefix inserter 170, which can add a cyclic prefix to each OFDM symbol 165 to generate a pre-distorted OFDM symbol 175 having a cyclic prefix. As known to the skilled artisan, the cyclic prefix can be a repeat of the end of an OFDM symbol inserted at the beginning of the symbol. Use of the cyclic prefixes with the OFDM symbols can mitigate inter-symbol interference (ISI) in multi-path fading channels.

The system 100 also can include a limiter 180 that can receive the OFDM symbol 175 and limit its amplitude, for example by removing portions of the OFDM symbol 175 that exceed the amplitude limiting threshold. For instance, suppose the amplitude level of the OFDM symbol 175 varies in value from 1-15 and the amplitude limiting threshold is 10. The amplitude of the limiter output then may track the amplitude of the limiter input when the amplitude of the limiter input is less than or equal to 10. However, when the amplitude of the limiter input exceeds 10, the amplitude of the limiter output can remain at 10 (e.g., input=12-->output=10). Thus the limiter 180 can generate an amplitude-limited pre-distorted OFDM symbol 185 and output such OFDM symbol 185. For instance, the limiter 180 can communicate the pre-distorted OFDM symbol 185 to other transmitter components for further processing and transmission.

Such components/subsystems 105-180 can be coupled to one another and implemented within the structure of a baseband signal processor, modem, transmitter, transceiver and/or other suitable device or system. It also should be appreciated that the various components and/or subsystems of system 100 can be implemented using computer programs executing within suitable digital signal processors, one or more discreet components, one or more programmable logic devices, or any combination thereof.

Figure 2:
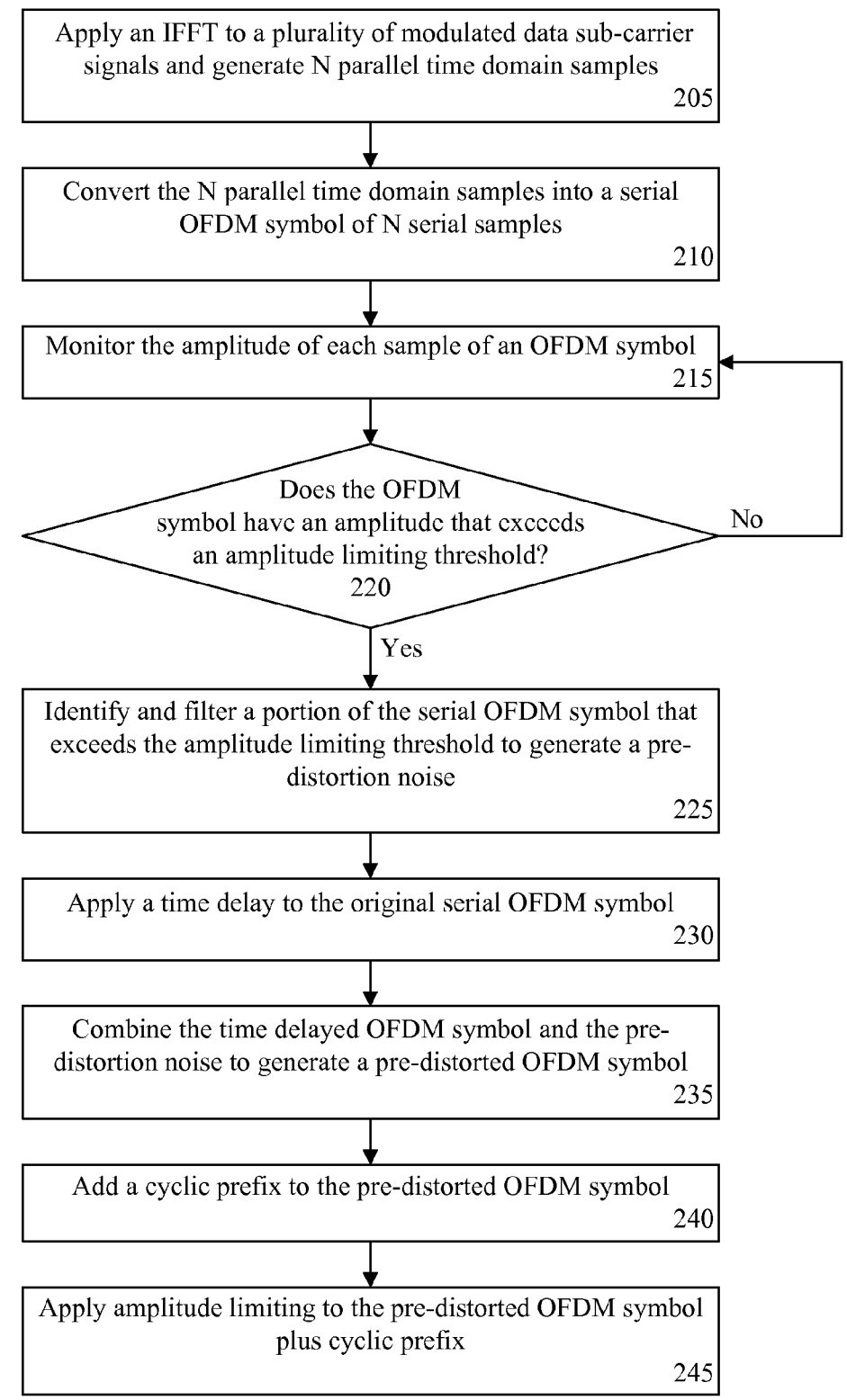
FIG. 2 depicts a flow chart that is useful for understanding the present invention.

FIG. 2 depicts a flow chart describing a method 200 of OFDM signal processing that is useful for understanding the present invention. The method 200 can be implemented using, for example, the system 100 described in FIG. 1. The method 200 can begin at step 205 with an IFFT being applied to a plurality of modulated data subcarrier signals to generate N parallel time domain samples of an OFDM symbol. At step 210, the N parallel time domain samples can be converted into a serial OFDM symbol of N serial samples. At step 215, the amplitude of each sample of the OFDM symbol can be monitored.

At step 220, when the peak amplitude of a sample of an OFDM symbol exceeds an amplitude limiting threshold, the method can proceed to step 225. Otherwise, the process can return to step 215. At step 225, a portion of the serial OFDM symbol that exceeds the amplitude limiting threshold can be identified and filtered to generate a pre-distortion noise. Generation of the pre-distortion noise will be discussed herein in greater detail with respect to FIG. 3.

Continuing to step 230, a time delay can be applied to the original serial OFDM symbol of step 210 to produce a time delayed OFDM symbol. The time delay can be equal to the time interval required for the system to complete the processing of steps 220-225. Accordingly, the serial OFDM symbol can be time aligned with the pre-distortion noise. For example, if the time required to process the pre-distortion noise in steps 220-225 is 20 μS, at step 230 the serial OFDM symbol can be delayed by a period of time equal to the same 20 μS.

Proceeding to step 235, the pre-distortion noise can be combined with the time delayed OFDM symbol, generating a pre-distorted OFDM symbol. At step 240, a cyclic prefix optionally may be added to the pre-distorted OFDM symbol, generating a pre-distorted OFDM symbol having a cyclic prefix. At step 245, amplitude limiting optionally may be applied to the pre-distorted OFDM symbol having the cyclic prefix.

FIG. 3 is a flowchart depicting a method 300 of generating pre-distortion noise for digital pre-distortion of an orthogonal frequency division multiplexing (OFDM) signal. The method 300 can be implemented by the pre-distortion noise generator 140 and can begin in a state in which one or more portions of an OFDM symbol that exceed an amplitude limiting threshold have been detected. At step 305, the portion(s) of the OFDM signal above the amplitude limiting threshold can be processed to generate a limiting noise.

For example, and for the purpose of illustrating the principles of the present invention and not intending the limit the invention in any way, suppose the amplitude limiting threshold of the OFDM system is T. At the instant of a limiting event in an OFDM symbol, the limiting noise ($n_c$) can be expressed as:

$$n_c(n) = a_c \delta(n-c)$$

where c is a time index at which OFDM signal level is above the amplitude limiting threshold and where $$a_c = -\text{sgn}(x(n-c))[|x(n-c)| - T]$$

$$\delta(n-t) = \begin{cases} 1 & n = t \\ 0 & n \neq t, \end{cases}$$

where x is a time domain sample of the OFDM symbol and n is an integer that represents an index of the sample x. Clearly, n=0, 1, 2, ..., N−1 for an OFDM system with N-point FFT and IFFT. In other words, the limiting noise ($n_c$) can represent the identified portion of the OFDM symbol that resides above the amplitude limiting threshold. For example, if the amplitude limiting threshold has a value of 10 and the peak amplitude of the OFDM symbol has a value of 14, the limiting noise can contain the portion of the OFDM symbol that resides between the values of 10 and 14.

At step 310, the limiting noise can be filtered by the pre-distortion noise generator, for example, using a suitable filtering algorithm (hereinafter referred to as "filter") to produce filtered limiting, or pre-distortion, noise. To better understand the pre-distortion noise filtering, it should be noted that prior to IFFT being performed on the OFDM symbols, each OFDM symbol can contain multiple data subcarriers in frequency domain. As known by one skilled in the art, each subcarrier can be modulated with a different modulation scheme, such as BPSK, QPSK, 16QAM and 64QAM. Further, the bit load index of subcarrier k can be $B_k = 2(M-1)/3$, where M is the modulation index of the different modulation schemes. For example, the modulation index (M) can be equal to 16 and the bit load index ($B_k$) can be equal to 10.

The frequency response of the filter can correlate to the modulation index of each of a plurality of modulated subcarriers of an OFDM system. In particular, the frequency response of the filter can correlate to an inverse of a square root of the bit load index of each of the plurality of modulated subcarriers and can be described by the equation $$F(k) = \frac{1}{\sqrt{B_k}},$$

where k is the subcarrier index. For example, when the OFDM system contains 16 subcarriers, k can index from 1 to 16. Each of the subcarriers may have a different bit load index. Accordingly, multiple pre-distortion noise filter taps may be provided by the pre-distortion noise generator. In general, the number of the filter taps may be the same as the FFT size N. Also, as known to the skilled artisan, the filter impulse response can be periodic with a period N, which can be achieved by a cyclic shift. Consequently, the time domain impulse response of the filter can be expressed as:

$$f(n) = \text{IFFT}(F(k)), n, k = 0, 1, \ldots, N-1$$

where IFFT( ) represents inverse fast Fourier transform (IFFT) and N is an associated IFFT size.

The filter can be normalized such that the impulse response of the filter corresponding to the instant of a limiting event is unity, i.e., $$f_{norm}(n) = \frac{f(n)}{f(0)}.$$

Therefore, the filtered pre-distortion noise, $z_c$, can be written as:

$$z_c(n) = f_{norm}(n) \otimes n_c(n) = a_c f_{norm}(n-c) n = 0, 1, \ldots, N-1.$$

At step 315, the pre-distortion noise can be communicated to an adder.

At this point it should be noted that each time the peak amplitude of the OFDM symbol exceeds the amplitude limiting threshold, steps 305-315 can be repeated. As such, the above method for pre-distortion noise generation can be extended to the case of multiple limiting events, for example when there are a plurality of portions of the detected OFDM symbol that exceed the amplitude limiting threshold. For instance, at time index $C_1$ a first limiting event can be identified in which a portion $a_{c_1}$ of the OFDM symbol is detected as exceeding the amplitude limiting threshold, and at time index $C_2$ a second limiting event can be identified in which a second portion $a_{c_2}$ of the OFDM symbol is detected as exceeding the amplitude limiting threshold. In this case the filtered limiting, or pre-distortion, noise can be expressed as:

$$z_c(n) = f_{norm}(n) \otimes n_c(n) = \beta_{c_1} f_{norm}(n-c_1) + \beta_{c_2} f_{norm}(n-c_2)$$
$$n = 0, 1, \ldots, N-1$$

where the limiting noise variables $\beta_{c_1}$ and $\beta_{c_2}$ meet the requirement that $z_c(c_1) = \alpha_{c_1}$ and $z_c(c_2) = \alpha_{c_2}$, and N is the IFFT sample size. This can be achieved by solving the following linear equations:

$$\begin{bmatrix} 1 & f_{norm}(c_1 - c_2) \\ f_{norm}(c_2 - c_1) & 1 \end{bmatrix} \times \begin{bmatrix} \beta_{c_1} \\ \beta_{c_2} \end{bmatrix} = \begin{bmatrix} a_{c_1} \\ a_{c_2} \end{bmatrix}.$$

The limiting noise variables $\beta_{c_n}$ represent limiting noise portions generated by solving the linear equations and can be used in place of an identified portion $\alpha_{c_n}$ as an input to the pre-distortion filter.

In general, a plurality of linear equations can generate a plurality of limiting noise variables, and the number of linear equations solved can correspond to a number of the portions of the OFDM symbol that are identified as exceeding the amplitude limiting threshold. For example, when five limiting events occur during one OFDM symbol, five linear equations may be solved and five limiting noise portions can be generated. The five limiting noise portions can be input to the pre-distortion filter and summed to generate the pre-distortion noise.

Figure 4:
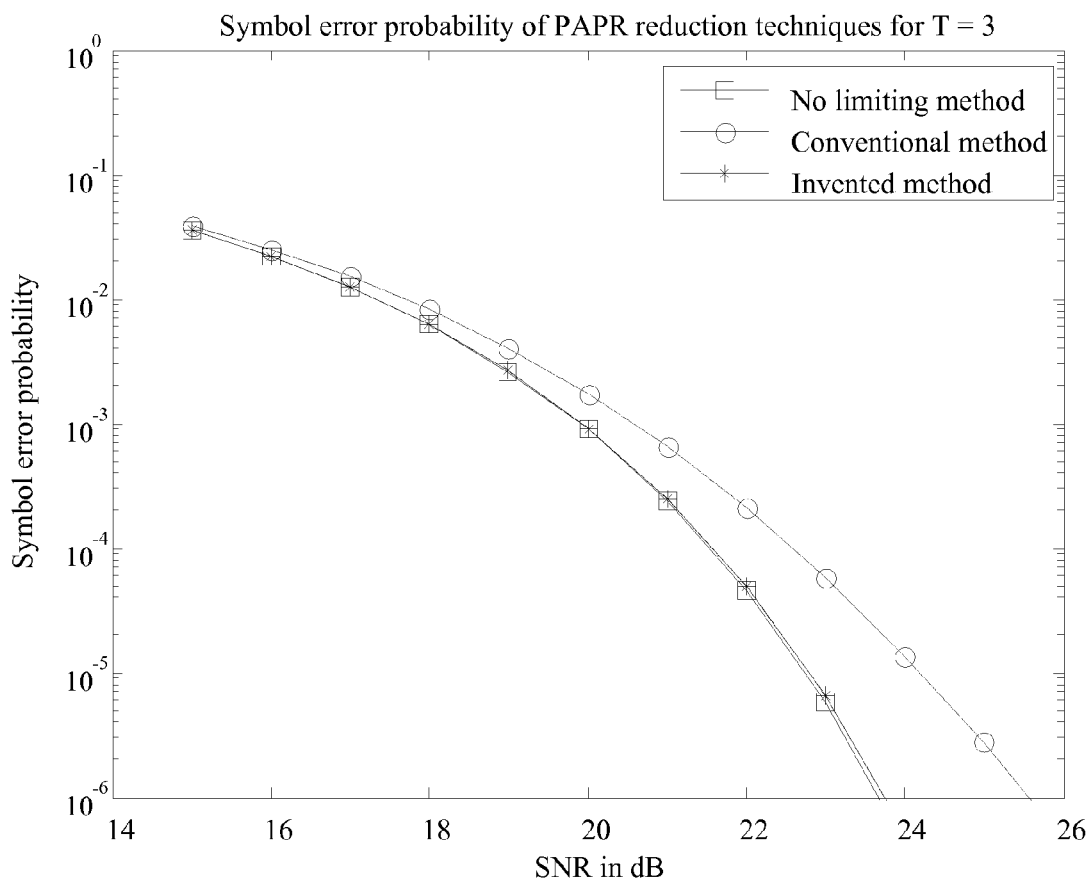
FIG. 4 is a graph that is useful for understanding the present invention.

FIG. 4 is a graph 400 that illustrates the performance improvements gained when implementing the present invention. As will be appreciated by the skilled artisan, the graph in FIG. 4 displays a symbol error probability of three different methods of OFDM signal generation. Such methods include a method that provides no output signal limiting, a method that provides conventional output signal limiting, and a method implemented in accordance with the present invention. For the latter two methods, the symbol error probability is displayed using an amplitude limiting threshold corresponding to a limiting level that is three times the square root of the original OFDM signal power. The symbol error probability for each plot is plotted as a function of the signal-to-noise ratio (SNR) of the OFDM system. The plots demonstrate that the present invention can provide symbol error rates similar to the method that provides no signal limiting but which has the disadvantage of requiring a power amplifier with a large linear operating range, while the conventional limiting method demonstrates a significant SER degradation due to signal damage resulting from the nonlinear effects of limiting.

To illustrate the theory behind this improved symbol error probability, consider a case where the OFDM symbol is limited at the transmitter. At the receiver, a cyclic prefix can be removed. An FFT then can be applied to a received OFDM symbol for subcarrier signal recovery. The signal on kth subcarrier can be expressed as:

$$\hat{X}(k) = G_k[X(k) + N_c(k)] + N_g$$

where $G_k$ and $N_g$ respectively represent an overall channel impulse response in frequency domain and an additive white Gaussian noise (AWGN) with a variance $\sigma^2$. $X(k)$ can be a normalized information symbol on the kth subcarrier, which typically can be an M-order quadrature amplitude modulation (MQAM) symbol. $N_c(k)$ can be a frequency domain limiting noise on the kth subcarrier, which can be expressed as:

$$N_c(k) = FFT(n_c(n))|_k = \frac{a_c}{\sqrt{N}} e^{-j2\pi ck/N}.$$

The variance of $N_c(k)$ is $\sigma_c^2/N$ where $\sigma_c^2 = \text{var}(a_c)$ is a time domain limiting noise variance. Consequently, the received SNR can be expressed as:

$$SNR = \frac{G_k^2}{\sigma^2 + G_k^2 \frac{\sigma_c^2}{N}}.$$

A probability of symbol error for MQAM on the kth subcarrier can depend on the SNR and may be expressed as:

$$P_e(k) = 2\left(1 - \frac{1}{\sqrt{M}}\right)\text{erfc}\left(\sqrt{\frac{1}{E + B_k \frac{\sigma_c^2}{N}}}\right) \times \left[1 - 0.5\left(1 - \frac{1}{\sqrt{M}}\right)\text{erfc}\left(\sqrt{\frac{1}{E + B_k \frac{\sigma_c^2}{N}}}\right)\right]$$

and the probability of symbol error can be approximated by:

$$P_e(k) = 2\text{erfc}\left(\sqrt{\frac{1}{E + B_k \frac{\sigma_c^2}{N}}}\right)$$

where $B_k = 2(M-1)/3$ represents the bit load index on MQAM symbol on the kth subcarrier, the error function (erfc) is defined as:

$$\text{erfc}(T) = \frac{2}{\sqrt{\pi}} \int_T^\infty e^{-\frac{x^2}{2}} dx$$

and $E = B_k \sigma^2 / G_k^2$ represents the inverse of non-limiting SNR per symbol scaled by $B_k$. It should be noted that $\sigma^2/G_k^2$ is the inverse of the SNR in the case of no limiting noise and that, for a given target symbol error rate (SER) and MQAM modulation, E is a constant.

As one skilled in the art will appreciate from the equation above, the impact of the limiting noise on SER performance can depend on the number of bits (e.g., bit load index) on the subcarrier. When limiting occurs, the subcarriers with more bits suffer a greater degradation in performance. Therefore, overall system performance can be dominated by performance degradation of the subcarriers with large numbers of bits. For example, the performance of a subcarrier utilizing 64QAM can degrade more than a subcarrier utilizing 16QAM, which degrades more than a subcarrier utilizing QPSK. To minimize overall error probability, the limiting noise can be redistributed in a reverse manner, wherein the limiting noise power can be allocated according to an inverse of the bit load index. To this end, the limiting noise can be passed through a filter that has a frequency response of:

$$F(k) = \frac{1}{\sqrt{B_k}}$$

where k is a subcarrier index of the OFDM system.

As can be seen by the skilled artisan, the impulse response of the filter can be given as:

$$f(n) = \text{IFFT}(F(k)), n, k = 0, 1, \ldots, N-1,$$

and the filtered limiting noise in the frequency domain can be expressed as:

$$Z_c(k) = \frac{a_c}{f(0)\sqrt{N}} F(k) e^{-j2\pi kc/N}.$$

Consequently, the SER of the kth subcarrier can be expressed as:

$$P_e(k) = 2\mathrm{erfc}\left(\sqrt{\frac{1}{E + \frac{\sigma_c^2}{Nf^2(0)}}}\right)$$

and the impact of the filtered limiting noise on SER is independent of the bit load index of the kth subcarrier.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

This invention can be embodied in other forms without departing from the spirit or essential attributes thereof. Accordingly, reference should be made to the following claims, rather than to the foregoing specification, as indicating the scope of the invention.

What is claimed is:

1. A method of processing an orthogonal frequency division multiplexing (OFDM) signal comprising:
   identifying at least one portion of an OFDM symbol that exceeds an amplitude limiting threshold;
   filtering the identified portion of the OFDM symbol to generate a pre-distortion noise, wherein filtering comprises filtering the identified portion of the OFDM symbol with a filter whose frequency response correlates to one or more of:
      a modulation index of at least one modulated subcarrier on which the OFDM symbol is received, and
      an inverse of a square root of a bit load index of at least one modulated subcarrier from which the OFDM symbol is generated;
   combining the OFDM symbol and the pre-distortion noise to generate a pre-distorted OFDM symbol; and
   outputting the pre-distorted OFDM symbol.

2. The method of claim 1, further comprising generating a limiting indicator when the portion of the OFDM symbol exceeds the amplitude limiting threshold.

3. A method of processing an orthogonal frequency division multiplexing (OFDM) signal comprising:
   identifying at least a first portion and a second portion of an OFDM symbol that exceed an amplitude limiting threshold;
   filtering the identified portions of the OFDM symbol to generate a pre-distortion noise, wherein generation of the predistortion noise comprises solving a plurality of linear equations to generate a plurality of limiting noise variables, wherein a number of the linear equations solved corresponds to a number of portions of the OFDM symbol that are identified;
   combining the OFDM symbol and the pre-distortion noise to generate a pre-distorted OFDM symbol;
   outputting the pre-distorted OFDM symbol.

4. The method of claim 1, wherein combining the OFDM symbol further comprises:
   delaying the OFDM symbol by a period of time equal to a processing time required to generate the pre-distortion noise.

5. An OFDM signal processing system, comprising:
   a peak detector that identifies a portion of an OFDM symbol that exceeds an amplitude limiting threshold;
   a pre-distortion noise generator that filters the identified portion of the OFDM symbol and generates a pre-distortion noise, wherein filtering comprises filtering the identified portion of the OFDM symbol with a filter whose frequency response correlates to one or more of:
      a modulation index of at least one modulated subcarrier on which the OFDM symbol is received, and
      an inverse of a square root of a bit load index of at least one modulated subcarrier from which the OFDM symbol is generated; and
   an adder that combines the OFDM symbol and the pre-distortion noise to generate a pre-distorted OFDM symbol.

6. The system of claim 5, wherein:
   the peak detector generates a limiting indicator when the portion of the OFDM symbol exceeds the amplitude limiting threshold.

7. An OFDM signal processing system, comprising:
a peak detector that identifies at least a first portion and a second portion of the an OFDM symbol that exceed an amplitude limiting threshold;
a pre-distortion noise generator that filters the identified portions of the OFDM symbol and generates a pre-distortion noise, wherein the pre-distortion noise generator solves a plurality of linear equations to generate a plurality of limiting noise variables and a number of the linear equations solved corresponds to a number of portions of the OFDM symbol that are identified; and
an adder that combines the OFDM symbol and the pre-distortion noise to generate a pre-distorted OFDM symbol.

8. The system of claim 5, further comprising:
a delay module that delays the OFDM symbol by a period of time equal to a processing time required to generate the pre-distortion noise.

* * * * *